Patented Nov. 8, 1949

2,487,188

UNITED STATES PATENT OFFICE 2,487,188

OXIDATION OF ALDEHYDES

George W. Seymour, Blanche B. White, and Elisabeth Barabash, Cumberland, Md., assignors to Celanese Corporation of America, a corporation of Delaware No Drawing. Application May 19, 1945, Serial No. 594,789

4 Claims. (Cl. 260—530)

This invention relates to an improved process for the production of organic acids, and relates more particularly to the preparation of crotonic acid from crotonaldehyde by an improved catalytic oxidation process.

An object of this invention is the preparation of crotonic acid by oxidation processes involving the catalytic, liquid phase oxidation of crotonaldehyde.

Another object of this invention is the production of crotonic acid, by the oxidation of crotonaldehyde, in improved yield and of a satisfactory degree of purity with the minimum formation of undesirable aldehydic polymerization products.

Other objects of this invention will appear from the following detailed description.

Crotonaldehyde may be oxidized to the corresponding unsaturated acid in accordance with various well-known procedures. The processes heretofore employed are not as efficient as may be desired since the unsaturated character of the crotonaldehyde renders it susceptible to the formation of undesirable polymerization products during reaction. When conducting the oxidation on a relatively small laboratory scale, the formation of these undesirable polymerization products is not very serious. On a commercial scale, however, the elimination of these side reactions becomes exceedingly important if the yield obtained is to be satisfactory.

We have now discovered that crotonaldehyde may be oxidized to crotonic acid in high yield and with substantially decreased polymer formation if the oxidation is effected with free oxygen at a temperature of 5 to 10° C. in glacial acetic acid as a diluent, employing manganese salts as a catalyst to aid the oxidation.

Preferably, the catalyst employed comprises a mixture of manganese acetate and potassium permanganate in a ratio of 5 to 7 parts by weight of manganese acetate to each part by weight of potassium permanganate, the catalyst mixture being employed in a concentration of 0.1 to 0.2% by weight based on the glacial acetic acid diluent in which the oxidation is effected.

In accordance with our process, we prefer to effect the oxidation of crotonaldehyde to crotonic acid by dissolving the desired amount of manganese salts as catalyst in from 500 to 1000 parts by weight of glacial acetic acid, cooling the solution to 5 to 10° C. and, while gradually and continuously adding a predetermined amount of crotonaldehyde thereto, e. g. from 400 to 800 parts by weight, bubbling dry oxygen through the solution. To prevent the freezing of the glacial acetic acid diluent, we preferably add from 10 to 15% by weight of crotonaldehyde thereto prior to cooling and before the major portion is added to the reaction mixture. The gaseous oxygen is preferably introduced in a finely-divided form. In passing through the solution it also effectively maintains the same under continuous agitation. The passage of oxygen through the solution is continued after all of the crotonaldehyde has been added and completion of the oxidation reaction is observed by a change in color of the solution undergoing catalytic oxidation, the change in color being from brown to green. This change is usually observed after from 48 to 72 hours depending upon the rate at which the crotonaldehyde is added, the degree of dispersion of the added oxygen and the degree of agitation. The reaction mixture obtained is then fractionated to remove the acetic acid diluent and any unreacted crotonaldehyde, the distillation being preferably effected rapidly under reduced pressure and at a low temperature, e. g. at a pressure of 15 to 25 mm. of mercury and temperatures of 20 to 35° C. After removal of the diluent and unreacted crotonaldehyde, crude crotonic acid crystallizes out in the residue. The crude crystals may then be purified by recrystallization from hot water. Purified crotonic acid may be obtained in yields of 40 to 80% of theoretical in accordance with our process. Where temperature control is not maintained, yields of only 20 to 30% are at most obtained.

Example 2 parts by weight of a mixture of manganese acetate and potassium permanganate, in the proportion of 6.6 parts of manganese acetate to 1 part of potassium permanganate, are dissolved in 1000 parts by weight of glacial acetic acid and the solution obtained cooled to 5 to 8° C. To the cooled solution, contained in a suitable vertical vessel of cylindrical shape, are gradually added 435 parts by weight of crotonaldehyde. Simultaneously with the introduction of the crotonaldehyde, oxygen is circulated through the solution in finely divided form, the oxygen being entered into the base of the vessel through a sintered glass plate. The latter permits the passage of the gaseous oxygen but only in the form of very fine bubbles. The introduction of the oxygen through the sintered glass plate is continued along with the addition of crotonaldehyde, for a total of 72 hours while maintaining the temperature at 5 to 8° C. The color of the reaction mixture changes from brown to green when oxidation is completed.

The acetic acid and unreacted crotonaldehyde are then distilled off at 28° C. under a pressure of 25 mm. of mercury and the crude crotonic acid crystallizes out. The crude acid is purified by recrystallization in hot water and 200 parts by weight of purified crotonic acid are obtained. The purified crotonic acid obtained represents a yield of 78% of theoretical on the crotonaldehyde reacted. The unreacted crotonaldehyde and the acetic acid diluent recovered during distillation may be recycled in the process, the crotonaldehyde present serving to prevent solidification of the acetic acid at the low temperature employed for oxidation. The recycled crotonaldehyde is, of course, subject to oxidation together with the crotonaldehyde later added during the course of the reaction. The oxidation reaction may be made substantially continuous by employing dual oxidation reaction vessels or chambers and alternately effecting the desired oxidation in the respective chambers.

It is to be understood that the foregoing detailed description is given merely by way of illustration and that many variations may be made therein without departing from the spirit of our invention.

Having described our invention what we desire to secure by Letters Patent is:

1. Process for the production of crotonic acid, which comprises catalytically oxidizing crotonaldehyde by forming a solution of glacial acetic acid containing from 10 to 15% by weight of crotonaldehyde, cooling the solution to 5 to 10° C., adding the remainder of the crotonaldehyde to the reaction mixture and then passing free, gaseous oxygen through a solution of crotonaldehyde in glacial acetic acid maintained at a temperature of from 5 to 10° C., the oxidation catalyst employed comprising a mixture of manganese acetate and potassium permanganate.

2. Process for the production of crotonic acid, which comprises catalytically oxidizing crotonaldehyde by forming a solution of glacial acetic acid containing from 10 to 15% by weight of crotonaldehyde, cooling the solution to 5 to 10° C., adding the remainder of the crotonaldehyde to the reaction mixture and then passing free, gaseous oxygen through a solution of crotonaldehyde in glacial acetic acid maintained at a temperature of from 5 to 10° C., the oxidation catalyst employed comprising 0.1 to 0.2% by weight of the glacial acetic acid, of a mixture of manganese acetate and potassium permanganate.

3. Process for the production of crotonic acid, which comprises catalytically oxidizing crotonaldehyde by forming a solution of glacial acetic acid containing from 10 to 15% by weight of crotonaldehyde, cooling the solution to 5 to 10° C., adding the remainder of the crotonaldehyde to the reaction mixture and then passing free, gaseous oxygen through a solution of crotonaldehyde in glacial acetic acid maintained at a temperature of from 5 to 10° C., the oxidation catalyst employed comprising 0.1 to 0.2% by weight of the glacial acetic acid, of a mixture of manganese acetate and potassium permanganate in the ratio of 5 to 7 parts by weight of manganese acetate to each part of sodium permanganate.

4. Process for the production of crotonic acid, which comprises catalytically oxidizing crotonaldehyde by forming a solution of glacial acetic acid containing from 10 to 15% by weight of crotonaldehyde, cooling the solution to 5 to 10° C., adding the remainder of the crotonaldehyde to the reaction mixture and then passing free, gaseous oxygen through a solution of crotonaldehyde in glacial acetic acid maintained at a temperature of from 5 to 10° C., the oxidation catalyst employed comprising 0.1 to 0.2% by weight of the glacial acetic acid, of a mixture of manganese acetate and potassium permanganate in the ratio of 5 to 7 parts by weight of manganese acetate to each part of sodium permanganate, distilling off unreacted crotonaldehyde and acetic acid from the reaction mixture while maintaining the said reaction mixture under a pressure of 15 to 25 mm. of mercury and separating crotonic acid therefrom.

GEORGE W. SEYMOUR.
BLANCHE B. WHITE.
ELISABETH BARABASH.

REFERENCES CITED

The following references are of record in the file of this patent:

UNITED STATES PATENTS

| Number | Name | Date |
|---|---|---|
| 1,445,544 | Odinga | Feb. 13, 1923 |
| 2,183,325 | Staudinger | Dec. 12, 1939 |
| 2,212,900 | Groll et al. | Aug. 27, 1940 |
| 2,377,584 | Staudinger et al. | June 5, 1945 |
| 2,386,365 | Staudinger et al. | Oct. 9, 1945 |

FOREIGN PATENTS

| Number | Country | Date |
|---|---|---|
| 165,728 | Great Britain | Sept. 27, 1922 |
| 369,636 | Germany | Feb. 22, 1923 |

OTHER REFERENCES

Duchesne et al., Bull. Soc. Chim. (Paris), vol. 35, pp. 1311–1316 (1924).